S. H. MOSS.
COW HOLDER.
APPLICATION FILED SEPT. 7, 1910.
1,047,104.
Patented Dec. 10, 1912.
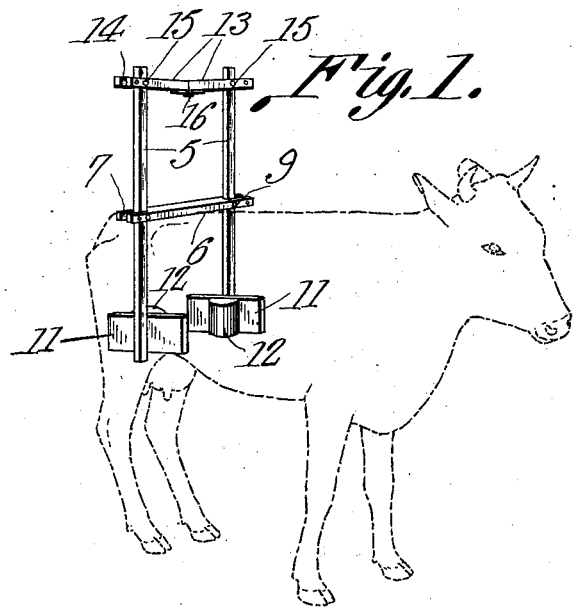
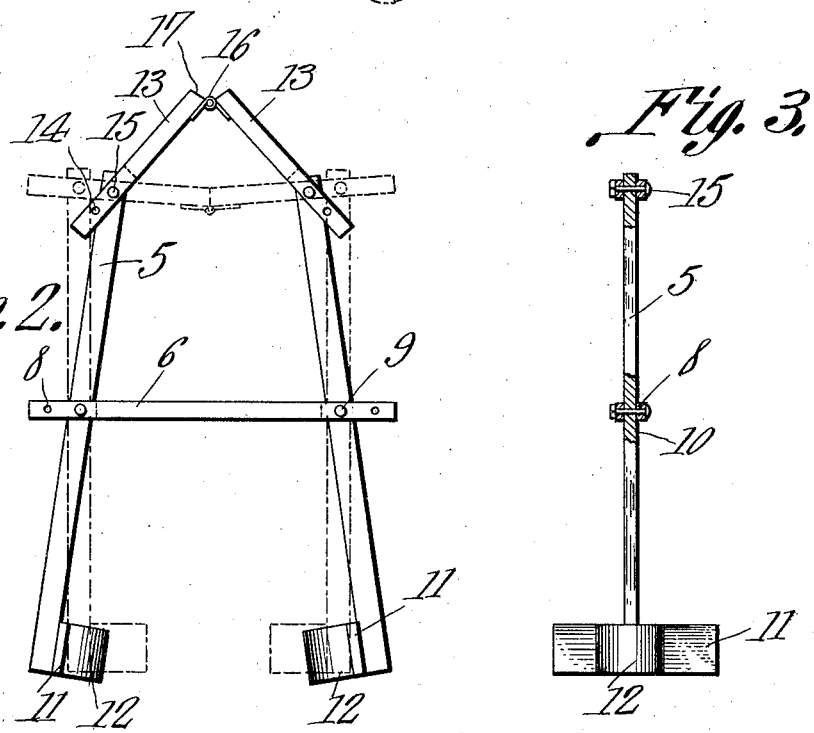
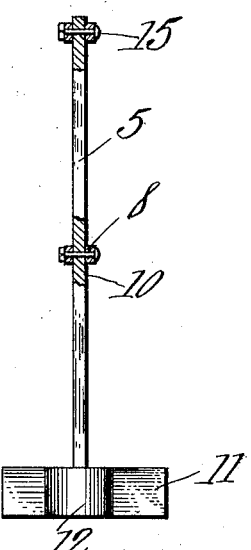
Witnesses
Shepley H. Moss,
Inventor
by C. A. Snow & Co.
Attorneys

UNITED STATES PATENT OFFICE.

SHEPLEY H. MOSS, OF MORRIS, ILLINOIS.

COW-HOLDER.

1,047,104.     Specification of Letters Patent.     Patented Dec. 10, 1912.

Application filed September 7, 1910. Serial No. 580,830.

*To all whom it may concern:*

Be it known that I, SHEPLEY H. MOSS, a citizen of the United States, residing at Morris, in the county of Grundy and State of Illinois, have invented a new and useful Cow-Holder, of which the following is a specification.

This invention relates to devices for preventing cows or other animals from kicking, and has for its object to provide a cow holder adapted to be set upon the back of the animal and to engage the flanks of the animal to prevent the expansion of the flank which precedes the action of kicking.

By the engagement of the holder to the flanks of the animal to prevent the flanks from expanding, upon the animal attempting to kick the flanks in tending to expand but being prevented from doing so by the holder, will annoy the cow to quiet the impulse to kick, or in other words, the flank being prevented from expanding will prevent the cow from kicking without pain.

This invention is embodied essentially in a cross bar adapted to rest upon the animal's back, upright jaws pivoted to the ends of the cross bar and adapted to straddle the sides of the animal and having means at their lower ends to bear against the flanks of the animal and a toggle lever pivoted to the upper end of the jaws to distend the upper ends of the jaws whereby the lower ends are borne against the flanks of the animal.

The invention is illustrated in the accompanying drawings, wherein similar reference characters indicate similar parts, and wherein:

Figure 1 is a perspective view of the device the same being illustrated as applied to a cow. Fig. 2 is a view in front elevation of the device the same being shown in full lines in position before application to the cow and in dotted lines in position after such application. Fig. 3 is a vertical sectional view from front to rear through the device in the dotted line position of Fig. 2.

In the drawings, the device is illustrated as embodying in its structure two side members or jaws which are indicated by the numeral 5 and are in the nature of upright wooden bars. A cross bar 6 is bifurcated at its ends as at 7, and is formed in its bifurcations with several pairs of alined openings 8, the bars 5 being disposed one within each bifurcation of the bars 6 and a bolt 9 being engaged through one pair of the openings 8 and pivotally through an opening 10 formed in the corresponding bar 5 whereby to support, pivotally, the bars at the ends of the cross bar 6. It will be readily understood that the bars may be thus supported a greater or less distance apart as may be desired and to suit conditions to be presently explained. It will furthermore be observed that the openings 10 in the bars 5 are located at points substantially midway between their ends so that spreading of the upper ends of the bars will result in an approach of their lower ends. Secured to the lower end of each bar 5 is a plate indicated by the numeral 11 and carrying a substantially semi-cylindrical block 12, the pad, here shown as a block being secured at its plane face to the plate and having its curved face presented inwardly. It will be observed that the axis of each block 12 is vertical so that the blocks are transversely curved.

As a means for relatively spreading the upper ends of the jaws, there is provided a toggle, the links of which are indicated by the numeral 13 and each of these links, at its outer end is bifurcated as at 14, the furcations of each link being formed with several pairs of alined openings 15 through which and an opening in the upper end of the bar 5 is passed a bolt 15 serving to pivotally connect the upper ends of the bars 5, one between the furcations of each of the links. At their inner ends, the links are hingedly connected as at 16 and their said inner ends are slightly beveled as at 17 for a purpose to be presently fully explained.

From the foregoing description of the invention, it will be readily understood that by pressing the toggle to the dotted line position shown in Fig. 2 of the drawing, the upper ends of the jaws will be relatively spread and their lower ends will be caused to approach each other. Further it will be understood that this relative approach of the lower ends of the jaws may be varied by adjusting the connections between the upper ends of the jaws and the outer end of the toggle links. Furthermore it will be understood that inasmuch as the inner ends of these links are beveled as at 17, the links when the toggle is expanded, do not extend in a straight line but pass such line of extent and lock. In applying the device to a cow, the same is disposed as illustrated in Fig. 1 of the drawings in which position the pads 12 will rest against the flanks directly in advance of the hip joints, and after so disposing the device, downward pressure is exerted upon the toggle links causing the lower ends of the jaws to move inwardly and bring the pads to bear firmly against the animal. It will be readily understood of course that in order to detach the device it is only necessary to break the toggle joint whereupon the lower ends of the jaws will be separated to such degree as to permit of the device being readily lifted from the position shown in Fig. 1. When the device is in place upon the cow the cross bar 6 acts as a support because it rests upon her back, and the toggle may be said to be a spreader because its function is to spread the upper ends of the jaws.

What is claimed is:—

In a device of the character described, a substantially horizontal cross bar adapted to rest upon an animal's back and having its ends bifurcated, upright jaws received by the bifurcated ends of the said cross bar and adjustable and pivoted therein, the lower ends of the jaws being adapted to straddle the sides of the animal, pads carried by the lower ends of the said jaws to bear against the flanks of the animal, a toggle lever having the outer ends of the links thereof bifurcated and receiving the upper ends of the said jaws, the upper ends of the jaws being adjustable and pivoted in the bifurcated ends of the said links, the inner ends of the links of the toggle lever being beveled so that the links may be swung inwardly slightly beyond a straight line position in order to distend the upper ends of the jaws and contract the lower ends of the jaws to press the pads against the flanks of the animal.

In testimony that I claim the foregoing as my own, I have hereto affixed my signature in the presence of two witnesses.

SHEPLEY H. MOSS.

Witnesses:
L. J. BRANN,
W. G. PENN.

---

Copies of this patent may be obtained for five cents each, by addressing the "Commissioner of Patents, Washington, D. C."